CALKINS & WING.
Horse Hay Fork.
No. 43,832. Patented Aug. 16, 1864.
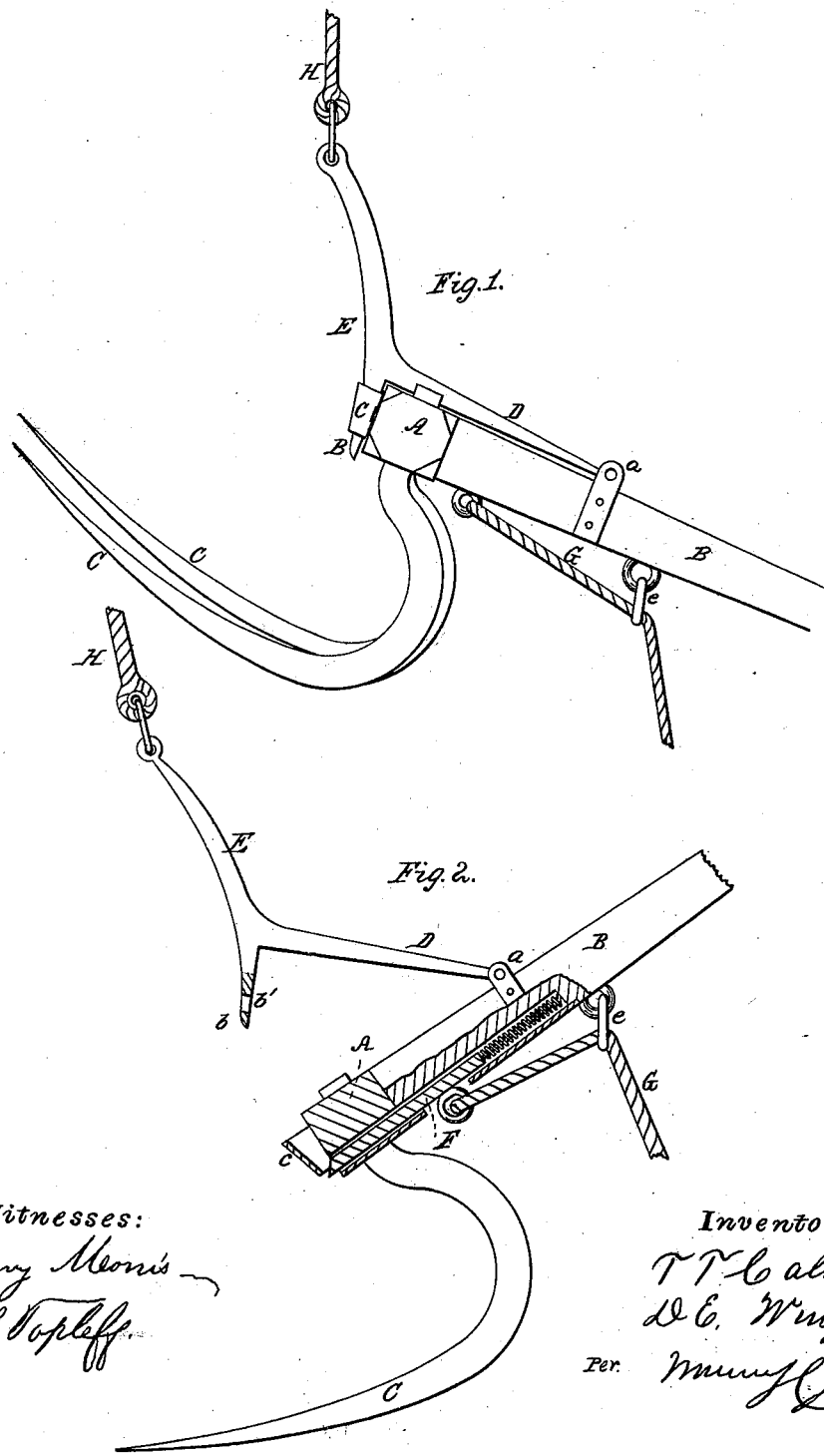

UNITED STATES PATENT OFFICE.

T. T. CALKINS AND D. E. WING, OF COXSACKIE, NEW YORK.

IMPROVEMENT IN HAY-ELEVATING FORKS.

Specification forming part of Letters Patent No. 43,832, dated August 16, 1864.

*To all whom it may concern:*

Be it known that we, T. T. CALKINS and D. E. WING, of Coxsackie, in the county of Greene and State of New York, have invented a new and Improved Horse Hay-Fork; and we do hereby declare that the following is a full, clear, and exact description thereof, which will enable others skilled in the art to to make and use the same, reference being had to the accompanying drawings, making a part of this specification, in which—

Figure 1 is a side view of our invention with the parts in a working position; Fig. 2, a side view of the same with the fork in a tilted position, showing how the load is discharged from the fork.

Similar letters of reference indicate like parts.

This invention relates to a new and improved horse hay-fork for elevating hay and discharging the same into a mow by means of a horse.

The object of the invention is to obtain a fork of the kind specified, which will be simple in construction, strong and durable, and capable of being manipulated with the greatest facility.

A represents the head of the fork, which has a handle, B, mortised into its rear side; and C C are the tines, which may be of the usual curved form and secured to the head A in any proper way.

D represents a metal bar, the back end of which is secured to the handle B by a hinge, a. At the front of the bar D there is a bar E, which is slightly curved and projects a short distance below the bar D, and a considerable distance above it, as shown in both figures. The bars D E may be forged out of a bar in one piece, or they may be cast in one piece.

In the lower part, b, of the bar E there is made a hole, b', and this part b, when the bar D is shoved down on the handle B, fits in a socket, c, at the front side of the head A, and a slide-bolt, F, in the under side of the handle B fits into the hole b', the outer end of the bolt F being beveled in order to admit of the lower end of the part b of the bar E forcing back the bolt F so that it may enter the socket c, a spring, d, forcing the bolt into the hole b' when the bar D comes in contact with the handle B.

G is a rope, which is attached to the bolt F, and passes through a guide-ring, e, at the under side of the handle.

H is the hoisting-rope, which is attached to the upper end of the bar E. When the bar D is secured down on the handle B in a working position the fork is capable of being elevated with its load, the tines C being slightly inclined upward, so as to retain or hold its load. The hoisting-rope is arranged in the usual way, passing over a pulley in the upper part of the barn and underneath a pulley on the flooring of the same, the horse being attached to the lower end of the rope. When the fork is elevated to the desired height, and over the spot where the load is to be deposited, the operator pulls the rope G, and thereby draws back the bolt F out from the hole b' of the part b of the bar E, and causes the fork to tilt, as shown in Fig. 2, so that the load may be discharged. The fork is then lowered by backing the horse, and when the former reaches the load the bar D is forced down upon the handle B and locked by the bolt F passing into the hole b' of the part b of E. The tines are then thrust into the hay, the horse started, and the fork, with its load, elevated, as before. By this arrangement the fork is allowed to tilt, so as to discharge its load with the greatest facility. This is owing to the bar D being hinged quite far back on the handle B, which causes, when the bar E is freed from the bolt F, a quick tilting or dropping of the fork, and a certain instantaneous discharge of its load.

The parts being simple, the fork may be cheaply constructed and in a very strong and durable manner.

Having thus described our invention, we claim as new and desire to secure by Letters Patent—

The bar D, connected by a hinge or joint, a, to the handle B, in combination with the bar E at the front of D, and the slide-bolt F or its equivalent, all arranged and applied to the fork in the manner substantially as and for the purpose specified.

T. T. CALKINS.
D. E. WING.

Witnesses:
JOHN B. BRONT,
CHAS. E. LAMPMAN.